US012681223B2

(12) United States Patent
Monovski et al.

(10) Patent No.: US 12,681,223 B2
(45) Date of Patent: Jul. 14, 2026

(54) COLOR HOLOGRAPHIC FOIL

(71) Applicant: DEMAX—HOLOGRAMS AD, Sofia (BG)

(72) Inventors: Valentin Konstantinov Monovski, Sofia (BG); Danail Trendafilov Akuzov, Sofia (BG); Andrii Ivanovskyi, Sofia (BG); Ihnat Pohan, Sofia (BG); Georgi Ivanov Stoilov, Sofia (BG); Mario Rumenov Dobrev, Sofia (BG); Ivo Rumenov Delchev, Sofia (BG)

(73) Assignee: DEMAX—HOLOGRAMS AD (BG)

( * ) Notice: Subject to any disclaimer, the term of this patent is extended or adjusted under 35 U.S.C. 154(b) by 295 days.

(21) Appl. No.: 18/693,965

(22) PCT Filed: Nov. 9, 2021

(86) PCT No.: PCT/BG2021/050003
§ 371 (c)(1),
(2) Date: Mar. 21, 2024

(87) PCT Pub. No.: WO2023/044546
PCT Pub. Date: Mar. 30, 2023

(65) Prior Publication Data
US 2024/0393513 A1     Nov. 28, 2024

(30) Foreign Application Priority Data

Sep. 21, 2021     (BG) ........................................ 113420

(51) Int. Cl.
| | |
|---|---|
| *G02B 5/26* | (2006.01) |
| *B42D 25/324* | (2014.01) |
(Continued)

(52) U.S. Cl.
CPC ............. *G02B 5/26* (2013.01); *B42D 25/324* (2014.10); *B42D 25/328* (2014.10); *B42D 25/373* (2014.10); *B42D 25/378* (2014.10)

(58) Field of Classification Search
CPC ......... G03H 1/0248; G03H 2001/2615; G03H 1/0244; G03H 1/0011; G02B 5/32; G02B 2027/0174; G02B 27/0944
See application file for complete search history.

(56) References Cited

U.S. PATENT DOCUMENTS 4,856,857 A * 8/1989 Takeuchi ............... B42D 25/46
                                                      359/3
8,363,323 B2 * 1/2013 Holmes ............... G03H 1/0256
                                                      359/24
(Continued)

FOREIGN PATENT DOCUMENTS

EP            3954543 A1 * 2/2022 ............. B42D 25/30

*Primary Examiner* — Jonathan Y Jung

(57)               ABSTRACT

The invention refers to a color holographic foil for protection of goods and documents from forgery and falsification. It includes successively placed foil base (1), release layer (2), embossing layer (3), reflective layer (4) and adhesive layer (5). The embossing layer comprises smooth areas (6) and micro-relief areas (7). The thickness of the optical reflective layer (4) is inversely proportional to the depth of the depressions in the micro-relief areas. At least two of the micro-relief areas are dyed areas (10) with embossing layer colored with a dye in different saturations of a single color tone. The saturation is directly proportional to the depth of the depressions. At least one dyed area is a multi-bonded area (11), having at least one micro-relief boundary (12) and at least one smooth boundary (13). The topography of the micro-relief in said multi-bonded areas is different from the topography of the neighbouring dyed areas.

7 Claims, 3 Drawing Sheets

(51) Int. Cl.
    B42D 25/328       (2014.01)
    B42D 25/373       (2014.01)
    B42D 25/378       (2014.01)

(56)            References Cited

U.S. PATENT DOCUMENTS

| | | | |
|---|---|---|---|
| 10,471,758 | B2 | 11/2019 | Harada et al. |
| 2010/0165425 | A1* | 7/2010 | Tompkin .................. G03H 1/02 |
| | | | 428/30 |
| 2014/0077487 | A1* | 3/2014 | Yashiki ................ B42D 25/391 |
| | | | 283/85 |

\* cited by examiner

B - B

B - B

COLOR HOLOGRAPHIC FOIL

FIELD OF INVENTION

The invention refers to a color multi-layer holographic foil, reproducing a holographic image with a color filter effect, and its applications include use as a security feature for proof the authenticity of goods and documents and as a decorative element.

PRIOR ART

An optical information medium is known [U.S. Pat. No. 10,471,758 B2], consisting of successively positioned base, release layer, embossing layer, reflective layer, mask layer, and a bonding layer. The embossing layer contains areas with micro-relief, consisting of protrusions and depressions, and smooth areas without any micro-relief. The embossing layer in the areas with micro-relief is colored with a dye in one or more colors. In case of change of the lighting and observation conditions (illumination angle and observation angle, the spectrum of the light source, etc.) this optical information medium reproduces a holographic image, including colorless sections and holographically colored sections, fdtered by a color filter into a single color. The image embossed on the foil differs from the original image when the latter includes small color graphical elements, micro-texts, and lines, positioned near the border of the embossing layer, because when the embossing layer is registered with the holographic image, a certain displacement occurs, resulting in the loss of a part of the image. Apart from that, the color filter has a single color, a single specific saturation of a single-color tone without any halftones and color nuances. The known optical information medium is manufactured by a slow multi-stage process, requiring special equipment which increases its cost, and limits its use.

It is the object of the present invention to provide a color holographic foil, reproducing a high quality holographic image, even the cases where the image contains fine graphic elements and texts, said image including colored sections filtered into different saturations of a single color tone or luminescing in various intensities of a single color tone, as well as colorless sections, and to provide an easy visual authentication of the object, protected by that color holographic foil.

SUMMARY OF INVENTION

The object is attained by a color holographic foil, including a base, on which the following layers are successively placed: release layer, embossing layer, optical reflective layer, and adhesive layer. Said embossing layer comprises smooth areas without any micro-relief, and micro-relief areas containing protrusions and depressions with a depth h. The distance p between two neighbouring depressions is between 0.1 pm and 50 μm, and the depth h of the depressions is from 0.05 pm to 2 μm. The thickness d of said reflective layer in the smooth areas is constant and it is between 15 nm and 100 nm. In said micro-relief areas, the thickness d of said reflective layer is variable and inversely proportional to the depth h of the depressions and it is at least 20% thinner than the thickness d in the smooth areas. At least two micro-relief areas are dyed areas, in which the embossing layer is colored in different saturations of a single color tone with a dye, as the saturation is directly proportional to the depth h of the depressions. At least one of said dyed areas is a multi-bonded area, having at least one micro-relief boundary, fully or partially bordering said dyed areas, and at least one smooth boundary fully bordering said smooth areas. The topography of the micro-relief in said multi-bonded areas is different from the topography of the micro-relief in the corresponding neighbouring dyed areas. The distance m between said smooth boundary and the nearest micro-relief boundary of the multi-bonded area is less than 0.2 mm.

The reproduced image comprises colored and colorless sections, all or portions of said colored sections are filtered into different saturations of a chosen single color tone. The image is colorless in the sections corresponding to the smooth areas, colored in the sections corresponding to the micro-relief areas, and colored with color filter effect with different saturations of a chosen color tone in the sections corresponding to the dyed areas and multibonded areas.

The contours of the particular colored sections with a color filter effect in the observed image are precisely registered with corresponding smooth boundaries of the multi-bonded areas which enables the accurate and precise reproduction of even the finest details from the original image.

The base is preferably a PET polymer foil with a thickness between 5 μm and 100 pm, but it can also be of other polymer materials, such as polypropylene, polycarbonate, polystyrene, etc.

The release layer is preferably of wax with a low-temperature melting point.

The embossing layer is preferably of an acrylate composite or other polymer materials, suitable for thermal forming of diffraction micro-relief thereon.

The adhesive layer is of acrylate or polyurethane composites, ensuring reliable bonding of the color holographic foil to the respective protected object—document or commodity.

The reflective layer may be of a transparent dielectric with a refraction index greater than 1.8, such as ZnS, TiO2, SiO, ZnTe, SiC, etc., or opaque metal, such as Al, Cu, Ag, Au, Cr, etc.

When the reflective layer is of transparent dielectric material, a holographic image filtered into different saturations of a single color tone is observed from both sides of the foil at reflection or in transmitted light. The color saturation is directly proportional to the depth of the micro-relief in the dyed and multi-bonded areas. The same effect is observed at reflection from the front side of the foil when the reflective layer is of metal. A color holographic image without a color filter effect is observed from the back side of the foil.

It is possible that the metal reflective layer covers only the dyed areas and multi-bonded areas. In this case a holographic image, filtered into different saturations of a single color tone is observed from the front side, in the reflected light. From the back side, the observed image has no color filter effect.

It is also possible the reflective layer in the dyed and multi-bonded areas comprises an additional color layer of polymer ink. The additional colored layer may be in arbitrary color tone.

If the dyed areas and multi-bonded areas are colored with a luminescent dye, when observed under combined natural and ultraviolet or infrared light, from the front side of the foil at reflection a color holographic image is observed, including colorless and colored sections, wherein all or portions of the colored sections luminesce with different intensity of a single color tone.

An advantage of the color holographic foil, according to the invention, is that it reproduces a holographic image, incorporating colored and colorless sections, wherein all or portions of the colored sections are fdtered into different saturations of a chosen color tone or luminesce with different intensity of a single color tone. The reproduced image is of high quality and fully corresponds to the original image, even if it contains fine graphic elements or micro-texts. The precise reproduction of even the finest details and the aforesaid optical effects facilitates authentication and reduces the risk of imitation. Apart from that, the proposed color holographic foil may be easily and effectively manufactured with the known equipment.

DESCRIPTION OF EMBODIMENTS

Figure 1:
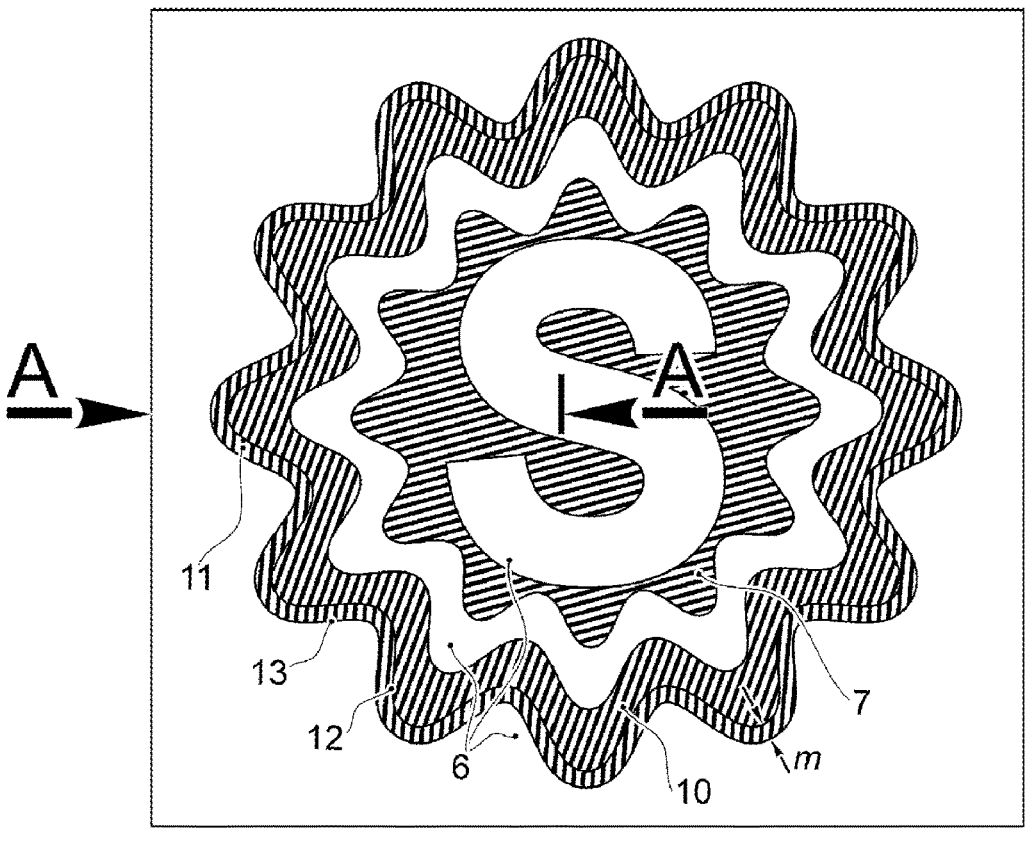
FIG. 1 is a front view of the color holographic foil according to the invention.
Figure 2:
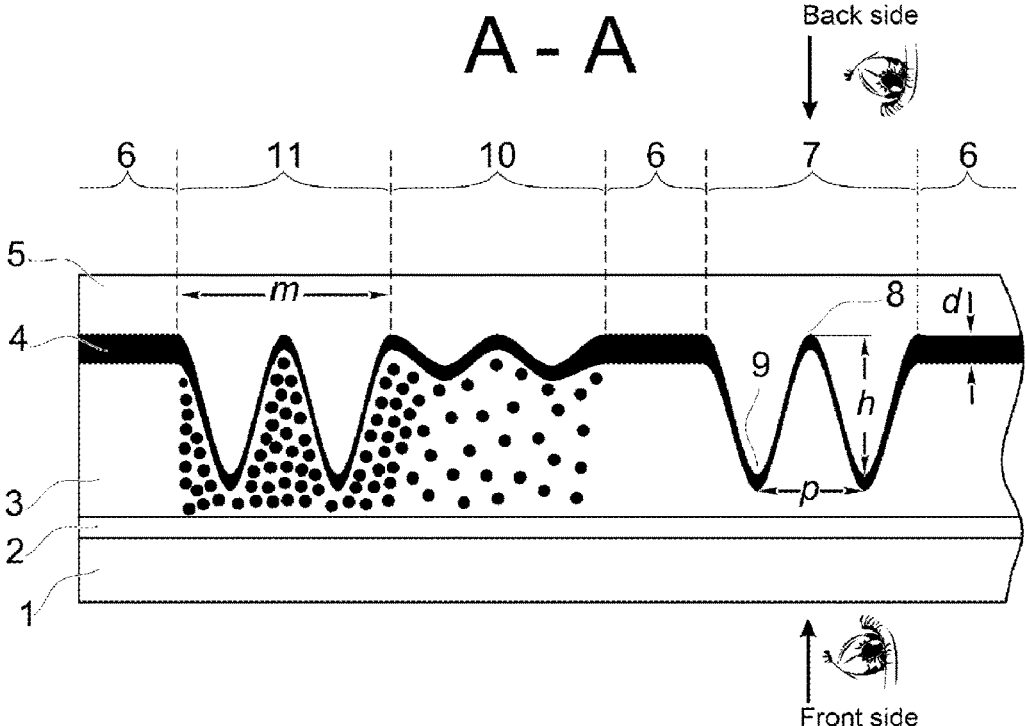
FIG. 2 is a partial cross-section along A-A from FIG. 1.

FIGS. 1 and 2 show an example embodiment of a color holographic foil, according to the invention. It includes a PET foil base 1, on which successively are placed release layer 2 of wax with a low-temperature melting point, embossing layer 3 of an acrylate composite, transparent reflective layer 4 of ZnS, and the adhesive layer 5 of a polyurethane composite. The embossing layer 3 comprises smooth areas 6 without any micro-relief and micro-relief areas 7 containing protrusions 8 and depressions 9 with a depth h in the interval 0.05 pm-2 μm, and distance p between the depressions 9 in the interval 1 pm-50 μm. In this particular embodiment, the distance p between two neighbouring depressions 9 is selected, for example, in the interval 0.8 pm-2 μm, and the depth h of the depressions 9 is from 0.15 pm to 0.2 pm. The thickness d of the reflective layer 4 in the smooth areas 6 is constant and in this particular embodiment is, for example, d=80 nm. In the micro-relief areas 7, the thickness d of the reflective layer 4 is inversely proportional to the depth h of the depressions 9, and it is at least 20% thinner than in the smooth areas 6. In this particular embodiment, the thickness d of the reflective layer 4 in the micro-relief areas 7 is chosen to be in the interval 40 nm-60 nm. Two of the micro-relief areas 7 are dyed areas 10, in which the embossing layer 3 is colored with a dye in different saturations of a single color tone, e.g. red, as the saturation is directly proportional to the depth h of the depressions 9.

At least one dyed area 10 is a multi-bonded area 11. In this particular embodiment, the multibonded area 11 is shaped as a closed undulatory figure. The multi-bonded area 11 has a micro-relief boundary 12, fully bordering the dyed area 10, and a smooth boundary 13, fully
  bordering the smooth areas 6. The distance m between
    said smooth boundary 13 and any micro-relief bound-
    ary 12 of the multi-bonded area 11 is less than 0.2 mm.
    The topography of the micro-relief of said multi-
    bonded area 11 is different from the topography of the
    microrelief of the neighbouring dyed area 10. The
    embossing layer 3 is not colored with a dye in the
    smooth areas 6 and in the micro-relief areas 7.

A holographic image is observed at reflection and transmission from front and back sides of the color holographic foil. It comprises colorless sections in smooth areas 6, holographically colored sections filtered into different saturations of red in the dyed areas 10 and in the multibonded areas 11, and holographically colored sections with no filter effect in the micro-relief areas 7.

The same visual effect is observed but from the front side of the foil at reflection only, when the reflective layer 4 is opaque, e.g. of Al. From the back side of the foil a holographic image with no color filter effect is observed at reflection.

If the dyed areas 10 and the multi-bonded areas 11 are colored with an ultraviolet luminescent dye, under mixed natural and ultraviolet or infrared light, from the front side of the foil at reflection a holographic image is observed; said image includes colorless and colored sections luminescing in different intensity of red.

Figure 3:
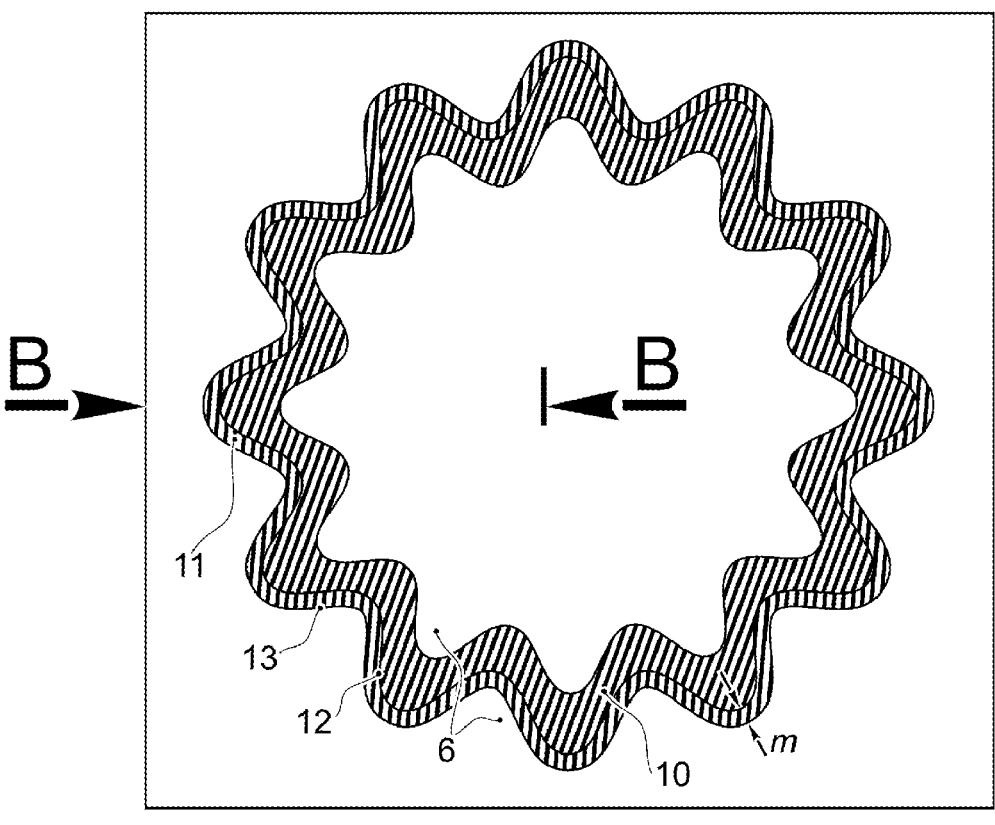
FIG. 3 is a front view of a variant embodiment of the color holographic foil according to the invention.
Figure 4:
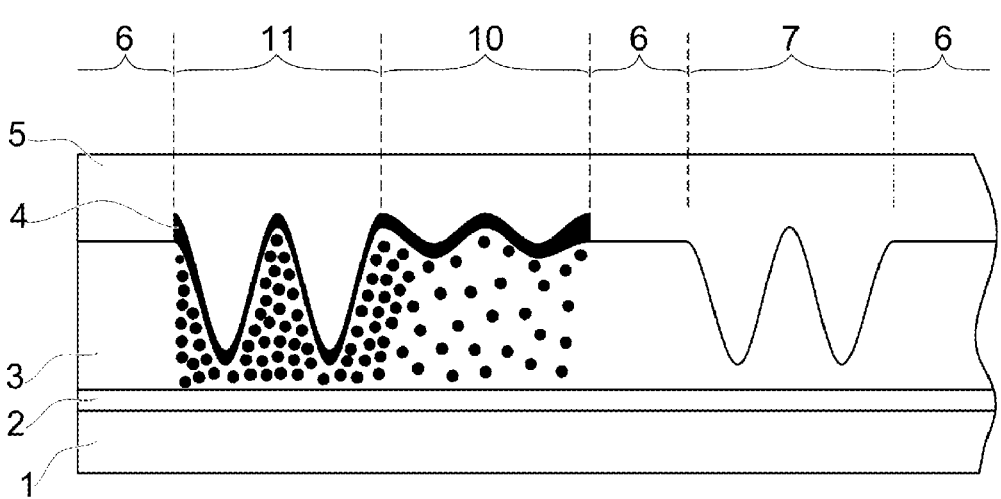
FIG. 4 is a partial cross-section along B-B from FIG. 3.

FIGS. 3 and 4 explain another embodiment of the present invention, where the reflective layer 4 is opaque, e.g., of Al and covers only the dyed areas 10 and the multi-bonded areas 11, which are colored, for example, in red color tone.

From the front side of the foil at reflection a holographic image is observed; said image comprises colorless transparent sections in the smooth areas 6 and in the micro-relief areas 7, and holographically colored sections filtered in different saturations of red in the dyed areas 10 and in the multi-bonded areas 11. From the back side of the foil, a holographic image with no color filter effect is observed at reflection. A silhouette image is observed in transmitted light, including opaque sections in the dyed areas 10 and in the multi-bonded areas 11, and transparent sections in other areas.

Figure 5:
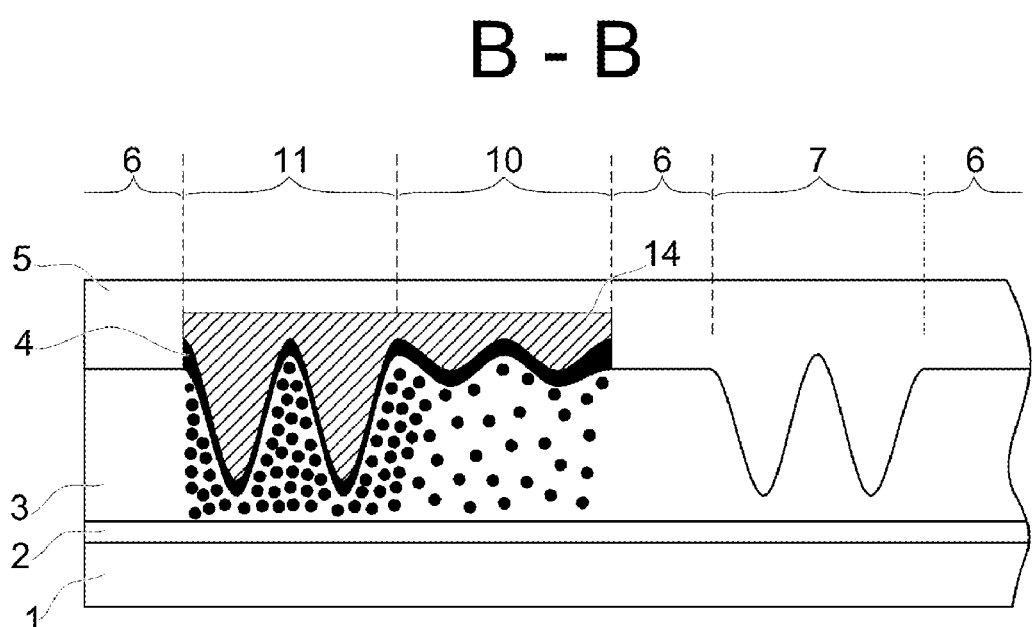
FIG. 5 is a cross-section of a variant embodiment of the color holographic foil according to the invention.

FIG. 5 shows another embodiment of the present invention, where the reflective layer 4 is opaque, e.g. of Al, and covers only the dyed areas 10, the multi-bonded areas 11 are, for example, in red color tone; and over the reflective layer 4 in the dyed areas 10 and multibonded areas 11 there is additional colored layer 14 of polymer ink in a chosen color tone, for example, green.

From the front side of the foil according to this embodiment, an image is observed at reflection; said image comprises colorless transparent sections in the smooth areas 6 and in the micro-relief areas 7, and holographically colored sections fdtered in different saturations of red in the dyed areas 10 and in the multi-bonded areas 11.

From the back side of the foil at reflection an image is observed; said image comprises colorless transparent sections in the smooth areas 6 and in the micro-relief areas 7, holographically colored sections, filtered in a specific saturation of green in the areas, where an additional colored layer 14 is provided. A silhouette image is observed in transmitted light, said image including opaque sections in the dyed areas 10 and in the multi-bonded areas 11, and transparent sections in other areas.

If the embossing layer 3 in the dyed areas 10 and the multi-bonded areas 11 is colored with luminescent dye, and the additional colored layer 14 is colored with a luminescent polymer ink, then under mixed natural and ultraviolet light, from the front side of the foil a holographic image is observed at reflection; said image comprises colorless transparent sections in the smooth areas 6 and in the micro-relief areas 7, and holographically colored sections, luminescing in different intensity of red, wherein the intensity is directly proportional to the depth h of the depressions 9 in the dyed areas 10 and in the multi-bonded areas 11.

5

From the back side of the foil, a holographic image is observed at reflection; said image comprises transparent colorless sections in the smooth areas 6 and in the micro-relief areas 7, and holographically colored sections, luminescing in a particular intensity of green in the areas where an additional colored layer 14 is provided. A silhouette image is observed in transmitted light, said image including opaque sections in the dyed areas 10 and in the multibonded areas 11, and colorless transparent sections in other areas. Under natural light a holographic image comprising colored and colorless sections, with no color fdter effect is observed from both sides of the foil.

The invention is not limited to the aforesaid example embodiments.

MANUFACTURING AND USE

A release layer 2 and an embossing layer 3 are successively applied on the polymer base 1 through known printing methods. The base is usually a PET foil, but it can also be of polypropylene, polycarbonate, polystyrene, and other similar polymer materials. The release layer 2 is usually of wax with a low-temperature melting point. The embossing layer 3 is usually of an acrylate composite or of other polymer materials, suitable for thermal embossing of diffraction micro-relief structures. A reflective layer 4 is applied to the embossing layer 3 through a vacuum evaporation technique, and then using a metal matrix, the micro-relief of the original image is embossed. The reflective layer 4 can be of transparent dielectric material with a refraction index greater than 1.8, such as ZnS, TiO2, SiO, ZnTe, SiC, etc. or of opaque metal, such as Al, Cu, Ag, Au, Cr, etc. The thickness of the reflective layer 4 is chosen so that it does not allow the dye solution to reach the embossing layer 3. When embossing the microrelief, the surface area of the embossing layer 3 increases, thus the reflective layer 4, applied thereon, becomes thinner. Thinning is greater in the areas with deep relief and smaller in the areas with a shallow relief. The thinner the reflective layer is, the weaker its barrier properties are. The foil with the printed micro-relief is coated with a solution of organically soluble dye in a chosen color tone. In smooth areas 6, where the thickness of the reflective layer 4 does not change when embossing the micro-relief, the reflective layer 4 does not allow the dye solution to reach the embossing layer 3 and it remains colorless. In the areas with shallow relief, the reflective layer 4 is thinner, its barrier properties are slightly weaker and a part of the dye solution passes into the embossing layer 3, coloring it. In the areas with deep relief, the thickness of the reflective layer 4 is greatly reduced, the barrier properties are much weaker and the dye solution passes more easily into the embossing layer 3. In these areas more intensive coloration takes place. The saturation of the color tone of the embossing layer 3 is directly proportional to the depth h of the depressions 9. Thus, the embossing layer 3 is colored in different saturations of the chosen color tone in the dyed areas 10 and in the multibonded areas 11. Upon evaporation of the solvent, a dying layer remains on top of the reflective layer 4 in smooth areas 6 and in shallower relief areas. This dying layer is then washed away with a suitable organic solvent, and an adhesive layer 5, usually of acrylate or of polyurethane composites is applied on the foil.

When the foil is illuminated, the light passes through the embossing layer 3 in the dyed areas 10 and in the multibonded areas 11 and forms a color holographic image filtered in different saturations of the color tone of the dye. The colors, as well as the various saturations or intensity of the color filter in different sections of the reproduced image are achieved through an appropriate topography of the micro-relief.

A variant embodiment of the color holographic foil, where the reflective layer covers only the dyed areas 10 and the multi-bonded areas 11 is obtained by applying a layer of photo-resistant polymer ink on the reflective layer 4, which is exposed to light from the front side of the foil, and then processed with a developer. The dye in the dyed areas 10 and in the multi-bonded areas 11 blocks the exposure light and when developed, the layer of photo-resistant polymer ink remains, forming an additional colored layer 14 in these areas which plays the role of a protective mask. In the other areas, the photo-resistant polymer ink layer is removed. The foil is subjected to a chemical etching where the reflective layer 4 is removed in the areas without a protective mask.

The photo-resistant polymer ink may be in different colors.

The color holographic foil, according to the invention is applied onto the object of protection (document or commodity) as a hot-stamping foil by stamping press or as a label by pressing manually the adhesive layer to the object.

What is claimed is:

1. A color holographic foil, including a base, on which a release layer, an embossing layer, an optical reflective layer having a thickness, and an adhesive layer are successively arranged, said embossing layer comprising smooth areas without any micro-relief and micro-relief areas, containing protrusions and depressions with a depth, and at least two micro-relief areas are dyed areas, where said embossing layer is colored with a dye, and at least one dyed area is a multi-bonded area, said multi-bonded area has at least one micro-relief boundary fully or partially bordering with said dyed areas, and at least one smooth boundary fully bordering with said smooth areas, characterized in that, the adhesive layer is arranged over the optical reflective layer, and a distance between said smooth boundary and the nearest micro-relief boundary is smaller than 0.2 mm, and wherein the micro-relief topography in said multi-bonded area differs from the micro-relief topography in corresponding neighbouring dyed areas, and said embossing layer in said dyed areas and in said multi bonded areas is colored in different saturations of a single color tone, wherein the distance between two neighbouring depressions is between 0.1 $\mu$m and 50 $\mu$m, and the depth of said depressions is from 0.05 $\mu$m to 2 $\mu$m, and the thickness of said reflective layer in said smooth areas is constant, ranging between 15 nm and 100 nm, and in said micro-relief areas thickness is variable and inversely proportional to the depth of the depressions and is at least 20% thinner than in said smooth areas.

2. The color holographic foil, according to claim 1, characterized in that said reflective layer is of transparent dielectric with a refraction index greater than 1.8.

3. The color holographic foil, according to claim 1, characterized in that said reflective layer is of one of the following metals: Al, Cu, Ag, Au, Cr.

4. The color holographic foil, according to claim 3, characterized in that said reflective layer only covers said dyed areas and said multi-bonded areas.

5. The color holographic foil, according to claim 4, characterized in that additional colored layer of polymer ink in a chosen single color tone is provided over said reflective layer in said dyed areas and in said multi-bonded areas.

6. The color holographic foil, according to claim 5, characterized in that said additional colored layer is of a luminescent ink.

7. The color holographic foil, according to claim 1, characterized in that said dyed areas and said multi-bonded areas are colored with a luminescent dye.

\* \* \* \* \*